US007643026B2

(12) United States Patent
Chai et al.

(10) Patent No.: US 7,643,026 B2
(45) Date of Patent: Jan. 5, 2010

(54) NURBS SURFACE DEFORMATION APPARATUS AND THE METHOD USING 3D TARGET CURVE

(75) Inventors: Young Ho Chai, Seoul (KR); Jung Hoon Kwon, Gyeonggi-do (KR); Jeong In Lee, Gyeonggi-do (KR)

(73) Assignee: Chung-Ang University Industry-Academic Cooperation Foundation, Seoul (KR)

( * ) Notice: Subject to any disclaimer, the term of this patent is extended or adjusted under 35 U.S.C. 154(b) by 471 days.

(21) Appl. No.: 11/622,513

(22) Filed: Jan. 12, 2007

(65) Prior Publication Data
US 2007/0229544 A1   Oct. 4, 2007

(30) Foreign Application Priority Data
Apr. 4, 2006   (KR)   ............ 10-2006-0030535

(51) Int. Cl.
   G06T 17/00   (2006.01)
   G06T 15/00   (2006.01)
(52) U.S. Cl. ............ 345/420; 345/419; 345/606; 345/442
(58) Field of Classification Search .............. None
   See application file for complete search history.

(56) References Cited

U.S. PATENT DOCUMENTS

| 5,608,856 | A * | 3/1997 | McInally ............ 345/442 |
| 6,369,815 | B1 * | 4/2002 | Celniker et al. ........ 345/420 |
| 6,590,575 | B1 * | 7/2003 | Takezawa ............ 345/419 |
| 7,196,702 | B1 * | 3/2007 | Lee et al. ............ 345/419 |
| 7,417,635 | B2 * | 8/2008 | Rockwood et al. ....... 345/419 |
| 2002/0183986 | A1 * | 12/2002 | Stewart et al. ......... 703/2 |
| 2004/0056871 | A1 * | 3/2004 | Milliron ............. 345/647 |
| 2005/0248562 | A1 * | 11/2005 | Maystrovsky et al. .... 345/419 |

OTHER PUBLICATIONS

Sederberg, et al, Free-Form Deformation of Solid Geometric Models, SIGGRAPH, Nov. 4, 1986, p. 151-160, vol. 20, Milliken & Co., LaGrange, GA.
Hsu, et al., Direct Manipulation of Free-Form Deformations, SIGGRAPH, Jul. 2, 1992, p. 177-184, vol. 26.

* cited by examiner

*Primary Examiner*—Daniel F Hajnik
(74) *Attorney, Agent, or Firm*—Adam K. Sacharoff; Much Shelist

(57) ABSTRACT

Disclosed herein is an apparatus and method for deforming a curved surface using a three-dimensional target curve. The curved surface deformation apparatus of the present invention includes object curved surface selection means, sample vertex extraction means, basis function calculation means, target curve input means, control point variation calculation means, and object curved surface deformation means. The object curved surface selection means selects all or part of the curved surface of the NURBS model. The sample vertex extraction means extracts a plurality of vertexes from the object curved surface. The basis function calculation means calculates a basis function of the object curved surface. The target curve input means inputs a target curve, composed of a plurality of target. The target curve projection means projects the target curve onto the object curved surface. The control point variation calculation means individually interpolates variation values ranging from projection points of the object curved surface corresponding to the target points, calculates variation values of sample vertexes, and calculates variations of control points using the calculated variation values and a pseudo-inverse matrix of the basis function. The object curved surface deformation means deforms the object curved surface on the basis of the calculated variations of the control points.

3 Claims, 19 Drawing Sheets

NURBS SURFACE DEFORMATION APPARATUS AND THE METHOD USING 3D TARGET CURVE

BACKGROUND OF THE INVENTION

1. Field of the Invention

The present invention relates, in general, to an apparatus and method for deforming a curved surface using a three-dimensional target curve and, more particularly, to an apparatus and method for deforming the curved surface of a non-uniform rational B-spline model on the basis of a three-dimensional target curve input by a user.

2. Description of the Related Art

Three-dimensional graphics have been widely applied in various fields, such as the production of movies, as well as the implementation of games, Computer Aided Design (CAD), animation, and virtual reality. A representative method of implementing three-dimensional graphics is polygon modeling. Such polygon modeling is based on solid modeling and denotes a scheme of implementing a desired shape by dividing or combining respective closed solids, all surfaces of which are closed. However, in order to represent a slightly curved surface, a great number of polygons is required depending on the extent of variation in the curvature of a curved surface, or the level of detail of an operation, so that there is a problem in that the final amount of data is excessively increased.

Due to such a problem, concern about Non-Uniform Rational B-Spline (NURBS) modeling has recently been highlighted. NURBS is an improved method of mathematically representing a three-dimensional curve, and is a modeling method capable of precisely defining, in particular, a non-uniform curve or surface.

In NURBS modeling, an object is not represented through sampling, but is represented by numerical formulas using control points and knot vectors. The control points are points used to represent the shape of a curved surface in a manner similar to that of a Bezier curve, which is used to represent computer fonts, etc. Knot vectors are required to prevent a problem in which the overall shape of a curved surface is changed due to the movement of a single point at the time of adjusting the shape of a curved surface, that is, a shape in which local adjustment is impossible, and are used to adjust only a portion of the curved surface, influenced by the knot vectors, among the entire curved surface, even if control points are changed. The use of such NURBS modeling confers many advantages in that more precise representation is possible depending on the hardware that is used, and gentle and smooth motion can be represented through the adjustment of parameters.

A principal operation in three-dimensional modeling can be referred to as an operation of deforming a curved surface. Methods of deforming a model can be broadly classified into an indirect deformation method (1) of deforming a model, as in the case of free-form deformation of a solid model by Seberberg & Parry, and a direct deformation method (2) of directly deforming a model, as in the case of direct manipulation in free-form deformation by Hsu, Hughes & Kaufman [(1) Free-Form Deformation of Solid Geometric Models, Proceedings of SIGGRAPH'86, Computer Graphics, p 151-p 160, 1986]/[(2) Direct Manipulation of Free-Form Deformations, Proceedings of SIGGRAPH'92, Computer Graphics, p 177-p 184, 1992].

The indirect deformation method, which deforms a model according to the deformation of a grating, is disadvantageous in that it is difficult to use to implement precise deformation, and it is not intuitively grasped by a user. In contrast, the direct deformation method is advantageous in that it allows a user to intuitively deform a model, but is disadvantageous in that, in order to deform a model into a desired form, a lot of time and expense are required to learn the usage method thereof, and the user must undergo a lot of trial and error.

Meanwhile, a method of a designer (or a user) expressing his or her thinking in a planar sketch is implemented by basically representing the contour, texture or feature of an object using curves. From the standpoint of a designer, such an operation method is implemented as drawing habits through use and education over a long period of time.

However, the plurality of graphic tools employing NURBS modeling does not sufficiently consider the drawing habits of a designer. Therefore, the operation of deforming a model is problematic in that it is not intuitively used by a designer and, moreover, a series of deformation methods defined by graphic tools must be learned for a long period of time.

SUMMARY OF THE INVENTION

Accordingly, the present invention has been made keeping in mind the above problems occurring in the prior art, and an object of the present invention is to provide an apparatus and method that can more intuitively and freely deform a curved surface using a target curve, in which the drawing habits of a designer are taken into consideration, when deforming the curved surface of a NURBS model.

In accordance with an aspect of the present invention to accomplish the above object, there is provided an apparatus for deforming a curved surface using a three-dimensional target curve, the apparatus being based on a computer and adapted to deform a curved surface of a Non-Uniform Rational B-Spline (NURBS) model, comprising object curved surface selection means for selecting all or part of the curved surface of the NURBS model as an object curved surface; sample vertex extraction means for extracting a plurality of vertexes from the object curved surface as sample vertexes; basis function calculation means for calculating a basis function of the object curved surface; target curve input means for inputting a target curve, composed of a plurality of target points having locations and directions, from a user; target curve projection means for projecting the target curve onto the object curved surface; control point variation calculation means for individually interpolating variation values x, y, and z ranging from projection points of the object curved surface corresponding to the target points, calculating variation values of sample vertexes included in a deformation area, and calculating variations of control points, constituting the object curved surface, using the calculated variation values and a pseudo-inverse matrix of the basis function; and object curved surface deformation means for deforming the object curved surface on the basis of the calculated variations of the control points.

In accordance with another aspect of the present invention to accomplish the above object, there is provided a method of deforming a curved surface using a three-dimensional target curve, the method being based on a computer and adapted to deform a curved surface of a Non-Uniform Rational B-Spline (NURBS) model, comprising an object curved surface selection step of selecting all or part of the curved surface of the NURBS model as an object curved surface; a sample vertex extraction step of extracting a plurality of vertexes from the object curved surface as sample vertexes; a basis function calculation step of calculating a basis function of the object curved surface; a target curve input step of inputting a target curve, composed of a plurality of target points having locations and directions, from a user; a target curve projection step of projecting the target curve onto the object curved surface in such a way that, if a number of target points, constituting the target curve, is equal to or less than a predetermined value, virtual target points are generated through curve interpolation; a control point variation calculation step of individually interpolating variation values x, y, and z ranging from projection points of the object curved surface corresponding to the target points, calculating variation values of sample vertexes included in a deformation area, and calculating variations of control points, constituting the object curved surface, using a product of the calculated variation values and a pseudo-inverse matrix of the basis function; and an object curved surface deformation step of deforming the object curved surface on the basis of the calculated variations of the control points.

In accordance with a further aspect of the present invention to accomplish the above object, there is provided a computer readable recording medium for storing a program for performing a method of deforming a curved surface of a Non-Uniform Rational B-Spline (NURBS) model, the program comprising an object curved surface selection function of selecting all or part of the curved surface of the NURBS model as an object curved surface; a sample vertex extraction function of extracting a plurality of vertexes from the object curved surface as sample vertexes; a basis function calculation function of calculating a basis function of the object curved surface; a target curve input function of inputting a target curve, composed of a plurality of target points having locations and directions, from a user; a target curve projection function of projecting the target curve onto the object curved surface; a control point variation calculation function of individually interpolating variation values x, y, and z ranging from projection points of the object curved surface corresponding to the target points, calculating variation values of sample vertexes included in a deformation area, and calculating variations of control points, constituting the object curved surface, using the calculated variation values and a pseudo-inverse matrix of the basis function; and an object curved surface deformation function of deforming the object curved surface on the basis of the calculated variations of the control points.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
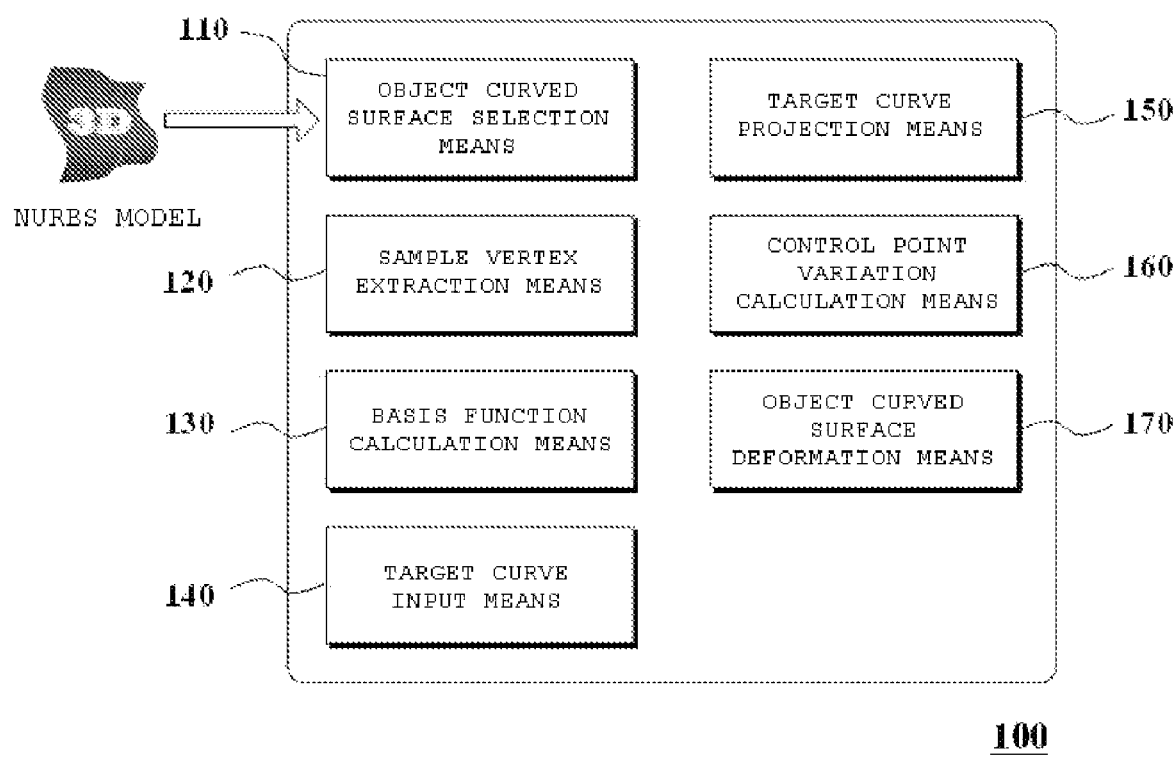
FIG. 1 is a schematic diagram showing an apparatus for deforming a curved surface according to the present invention.

Hereinafter, embodiments of the present invention will be described in detail with reference to the attached drawings.

Reference now should be made to the drawings, in which the same reference numerals are used throughout the different drawings to designate the same or similar components.

FIG. 1 illustrates the schematic construction of an apparatus 100 for deforming a curved surface using a three-dimensional target curve (hereinafter referred to as a 'curved surface deformation apparatus'). Although not described hereinafter, the curved surface deformation apparatus 100 of the present invention is preferably understood as being included as part of the functionality of three-dimensional graphic software (tool).

In detail, the curved surface deformation apparatus 100 includes an object curved surface selection means 110 for selecting all or part of the curved surface of an original NURBS model to be deformed as an object curved surface, a sample vertex extraction means 120 for extracting a plurality of sample vertexes from the selected object curved surface as sample vertexes, a basis function calculation means 130 for calculating a basis function using parameters u and v, which are used to extract the sample vertexes, a target curve input means 140 for inputting a target curve, composed of a plurality of target points having locations and directions, from a user, a target curve projection means 150 for projecting the input target curve onto the object curved surface, a control point variation calculation means 160 for calculating variations of control points, constituting the object curved surface, and an object curved surface deformation means 170 for deforming the object curved surface on the basis of calculated variations values of the control points.

Figure 2:
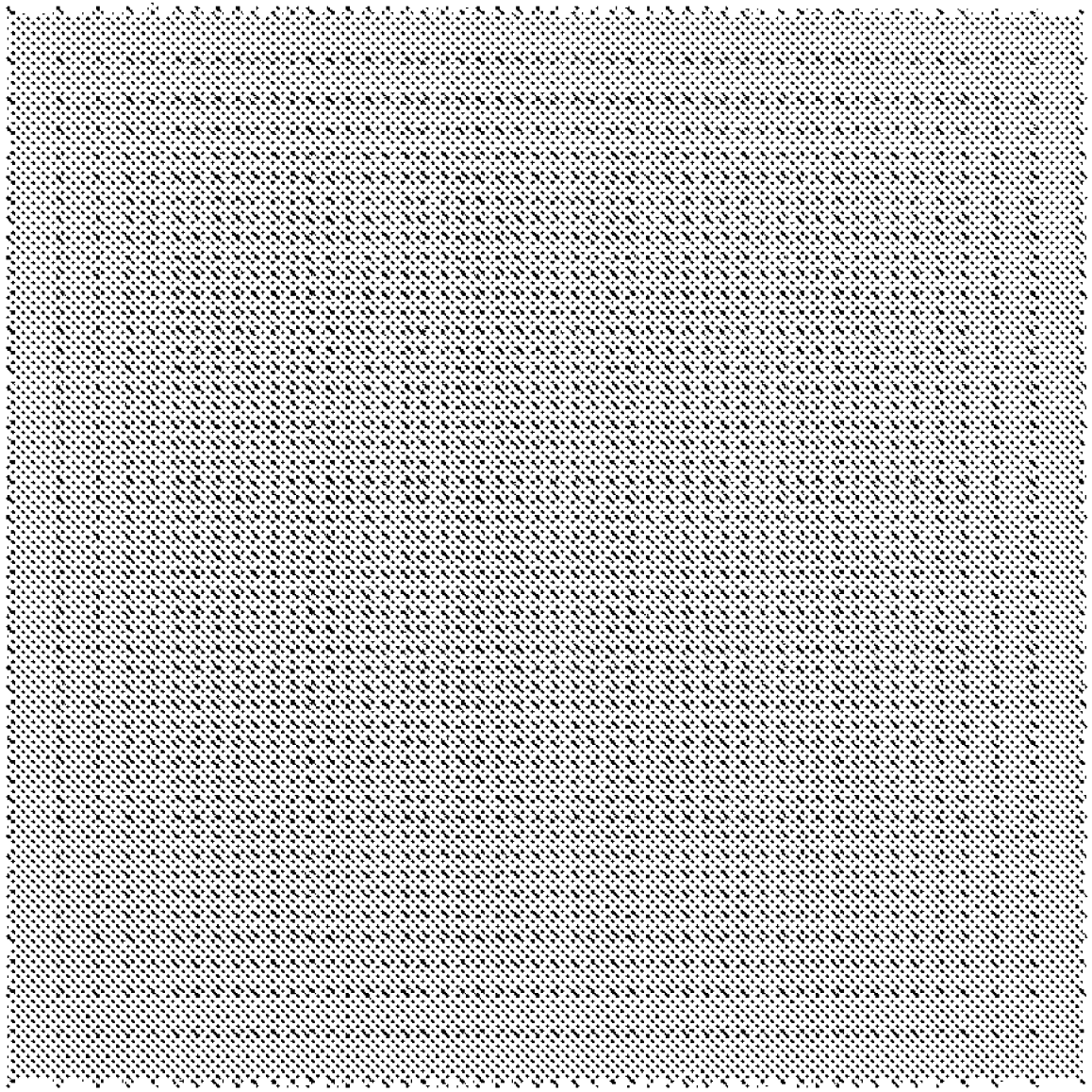
FIG. 2 illustrates the extraction of sample vertexes from an object curved surface.

The sample vertex extraction means 120 samples the deformation object curved surface selected by the object curved surface selection means 110 and then extracts part of a plurality of vertexes placed on the curved surface (refer to FIG. 2). In the sampling of the object curved surface, a parameter sequence functions as a 'key', and typically denotes a sequence obtained by arbitrarily extracting a number of parameters corresponding to the number of knots within the range of knot vectors (typically, the range of [0, 1]).

If the parameter sequence satisfies the following three conditions, that is, first, the sequence must have the values of a monotone increasing sequence, second, the sequence must be determined within the range of knot vectors, and third, the number of parameters in the sequence must be identical to the number of control points, the parameter sequence has values that can be arbitrarily selected by a user desiring to implement the present invention.

The extracted sample vertexes are used for a sample curved surface having variation values in the pseudo-inverse matrix of a basis function, which will be described later. As the number of extracted vertexes increases, the object curved surface can be more precisely deformed, but the processing time may increase in proportion to the number of vertexes. In contrast, as the number of vertexes decreases, the resultant values of the pseudo-inverse matrix may diverge. Therefore, the number of extracted sample vertexes must be suitably adjusted in consideration of the hardware performance of a system (computer) in which the technical spirit of the present invention is implemented.

Further, as described above, the basis function calculation means 130 calculates a basis function using values u and v (parameter sequence) used to extract the sample vertexes. The basis function is a cubic or higher order function. In the embodiment of the present invention, the basis function is set to a cubic function for convenience of description.

The target curve input means 140 receives a target curve required for deformation of the object curved surface. As described above, the target curve is composed of a plurality of target points having locations and directions. For reference, when the user sets the target curve, a so-called wand, displayed on a screen, is used. The wand is a type of interface implemented as a program in graphic software.

Further, the target curve projection means 150 projects the target curve, composed of the plurality of target points, onto the object curved surface. The locations of the target points projected onto the object curved surface are called projection points, which are locations that will be deformed on the object curved surface. If the number of target points of the input target curve is equal to or less than a predetermined value, virtual target points are preferably created through curve interpolation so that the number of target points reaches a certain number or more. The projection points of the target curve, projected onto the object curved surface, are connected to a sample curved surface, and are connected to sample vertexes within a deformation area that is defined on the basis of the projection points.

Figure 3:
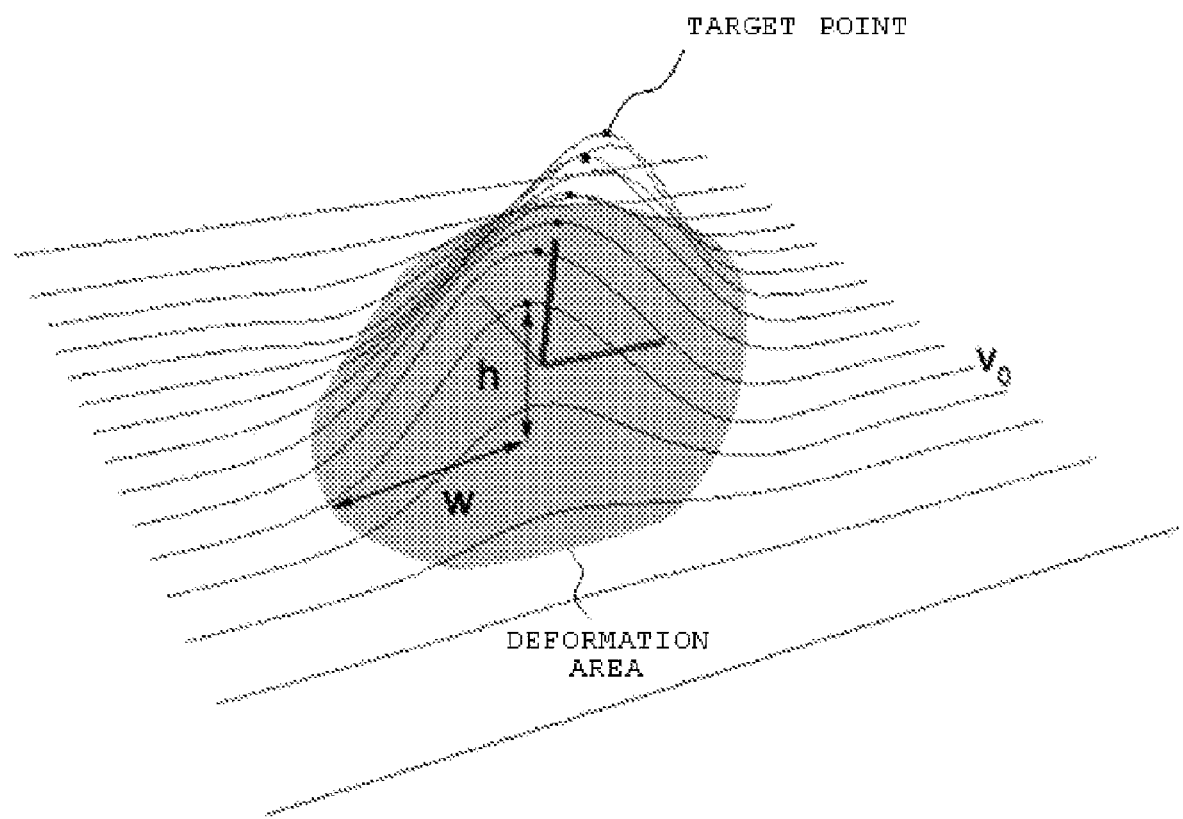
FIG. 3 illustrates a deformation area based on projection points when the target points of a target curve are projected onto an object curved surface.
Figure 4A:
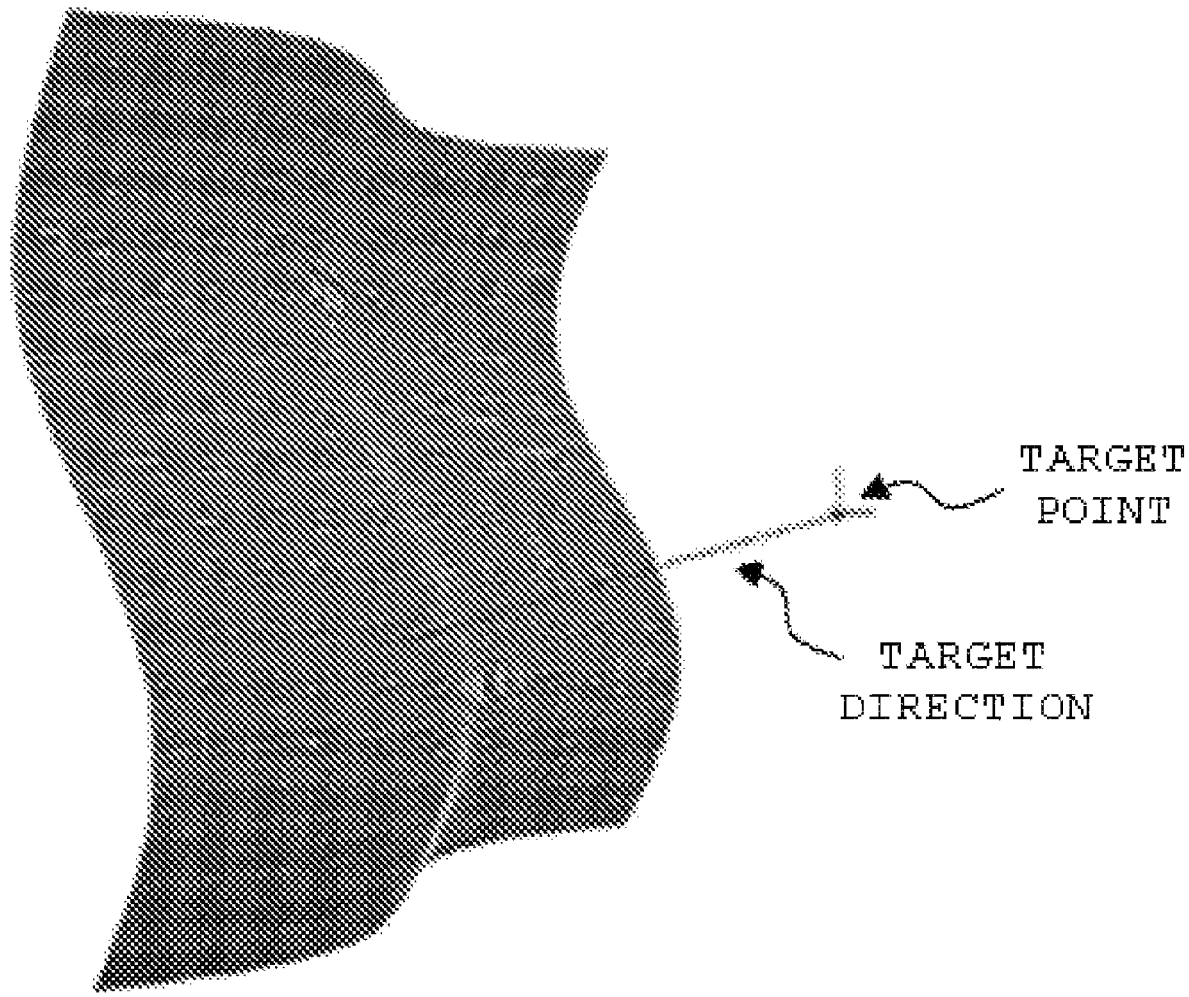
FIGS. 4A to 4C illustrate a procedure of detecting the projection points of an object curved surface using a target point and a target direction.
Figure 4B:
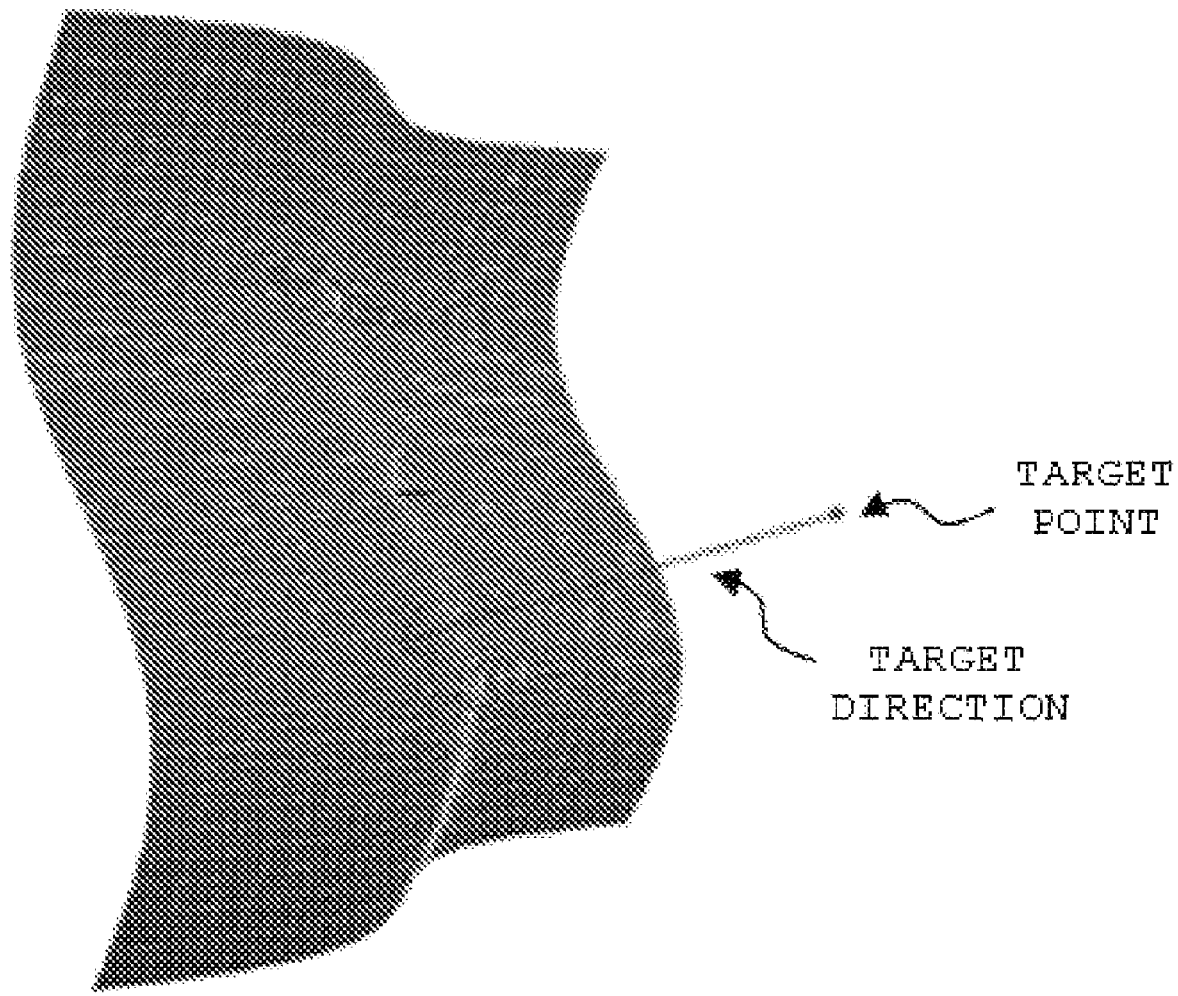
Figure 4C:
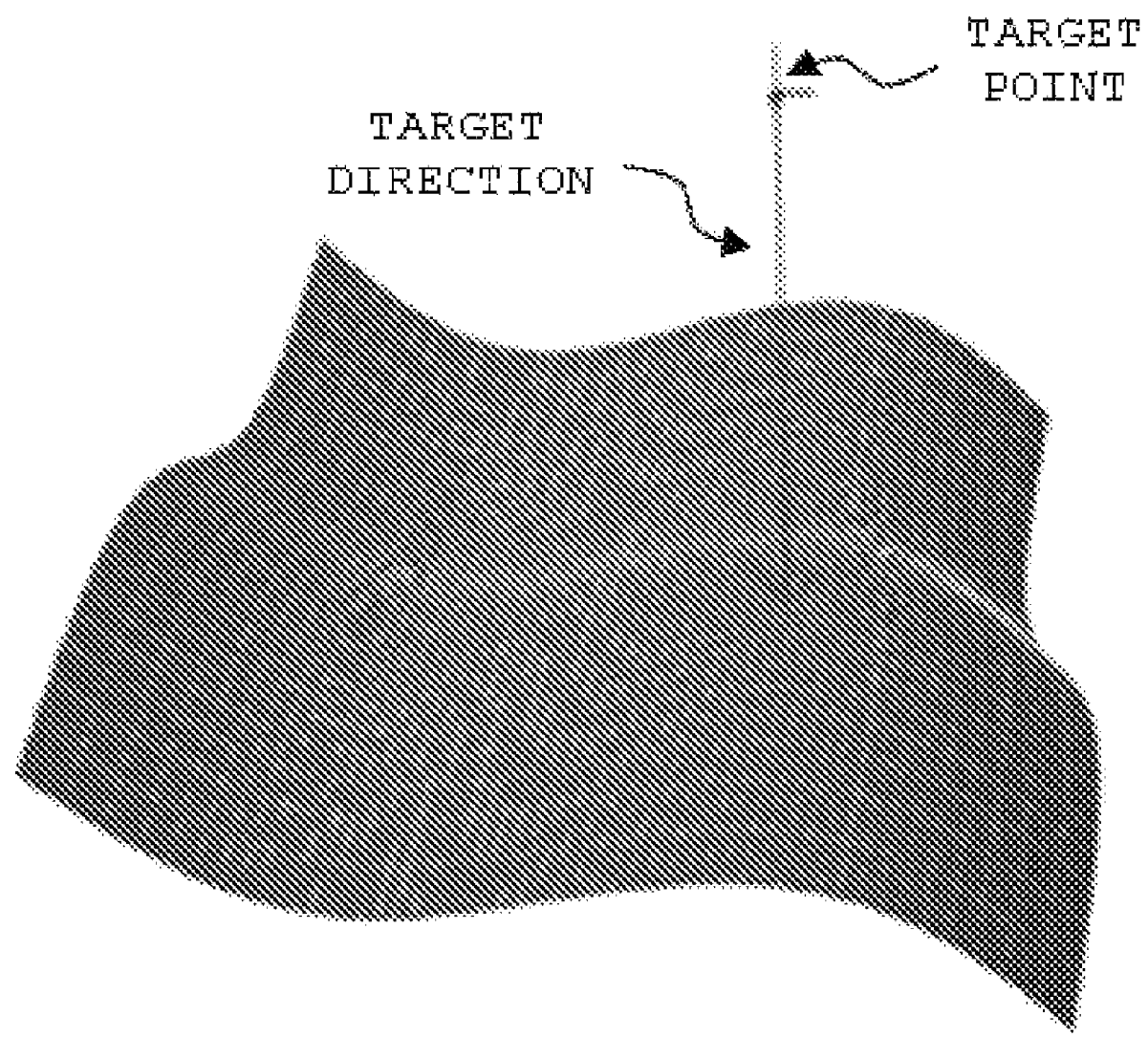

The function of the target curve projection means 150 according to the characteristic aspects of the present invention is described in detail below. FIG. 3 illustrates a deformation area based on projection points when the target points of the input target curve are projected on the object curved surface. Reference character 'w', which is not described, denotes a deformation area ranging from a projection point, and 'h' denotes variation from a projection point to an input target point. In order to detect a projection point formed according to the projected target curve, the method shown in FIGS. 4A to 4C can be used.

As shown in the drawing, it can be seen that, if an object curved surface and a target point exist, the locations of the target point and the curved surface are simultaneously converted using a transformation matrix for moving the target point to the origin of all coordinates and a transformation matrix for rotating the direction of the target point in the negative direction of a z axis. If the target point passes above an object curved surface when the target point progresses in the target direction thereof at the current location of the projection point, at least one point on the object curved surface passes through the z axis after the conversion has been performed.

In this case, a point on the curved surface, which passes through the z axis, and u and v values thereof are set to a projection point corresponding to the target point and u and v values of the projection point, respectively. This method is advantageous in that calculation time can be reduced and a projection point can be more promptly detected, compared to a method of performing an intersection test between a straight line and a curved surface in a space.

The projection point, detected through the above method, has values ranging from the location thereof to the target point as variation values. Preferably, variation values of other sample vertexes within the deformation area, connected to the projection point, can be calculated by interpolating the variation values in adjacent projection points using a polynomial interpolation method in order to obtain gentle and continuous variation values. For reference, if a sample curved surface is interpolated using a polynomial having a degree equal to or higher than the degree of the object curved surface, suitable resultant values can be obtained, within a range that prevents the divergence of calculation results of a pseudo-inverse matrix, while maintaining the continuity of the curved surface.

Figure 5:
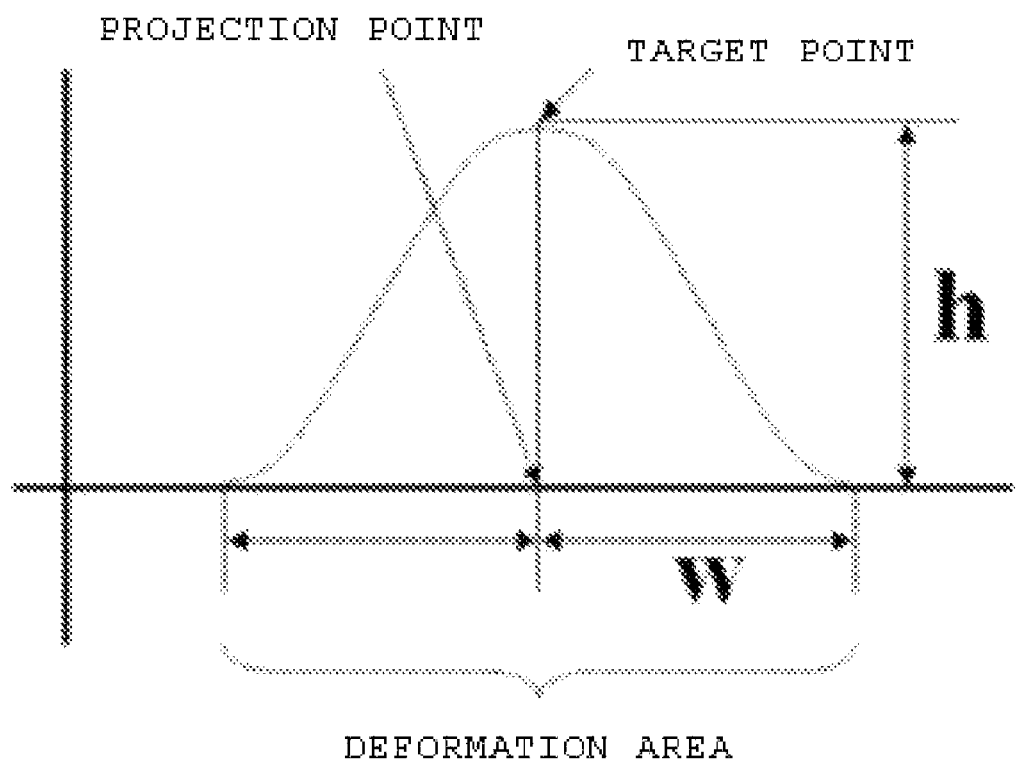
FIG. 5 illustrates a polynomial interpolation method.

With reference to FIG. 5, the polynomial interpolation method is described in detail. The interpolation method of FIG. 5 is an interpolation method that uses a cubic polynomial. A cubic polynomial required to interpolate a deformation area and a differential equation required to maintain continuity can be represented by the following Equations [1] and [2], respectively.

$$y = ax^3 + bx^2 + cx + d \quad [1]$$

$$y = 3ax^2 + 2bx + c \quad [2]$$

Equations [1] and [2] can be represented by the following Equations [3] and [4], respectively, when variation of the outermost portion of an interpolation region is assumed to be 0, and variation of a projection point is assumed to be the distance to a target point connected to the projection point.

$$ax^3 + bx^2 + cx + d = h_1 \quad [3]$$

$$a(x_1 - w)^3 + b(x_1 - w)^2 + c(x_1 - w) + d = 0 \quad [4]$$

Further, if differentiated values at the outermost portion of the deformation area and the projection point are set to 0 to maintain the continuity of a deformed curved surface, Equations [3] and [4] can be represented by the following Equations [5] and [6], respectively.

$$3ax^2 + 2bx + c = 0 \quad [5]$$

$$3a(x_1 - w)^2 + 2b(x_1 - w) + c = 0 \quad [6]$$

The u and v values at a sample vertex are set to x in the above Equations. Respective Equations are separately calculated with respect to deformation coordinates x, y and z at another vertex, and then each resultant value of Equations is set to y. Thereafter, if values a, b, c and d are calculated in the above Equations to obtain the variation of a value y to a value x, the following Equation [7] is obtained.

$$\begin{bmatrix} a \\ b \\ c \\ d \end{bmatrix} = \begin{bmatrix} x_1^3 & x_1^2 & x_1 & 1 \\ 3x_1^2 & 2x_1 & 1 & 0 \\ (x_1 - w)^3 & (x_1 - w)^2 & (x_1 - w) & 1 \\ 3(x_1 - w)^2 & 2(x_1 - w) & 1 & 0 \end{bmatrix}^{-1} \begin{bmatrix} h \\ 0 \\ 0 \\ 0 \end{bmatrix} \quad [7]$$

Variation values x, y and z from the projection point are interpolated using Equation [7], and thus variation values of all sample vertexes within the deformation area can be calculated.

Meanwhile, as described above, the control point variation calculation means 160 calculates variation values of all sample vertexes within the deformation area by individually interpolating the variation values x, y and z from the projection point, and then calculates variations of control points that constitute the object curved surface, using both the calculated variation values and the pseudo-inverse matrix of the basis function.

Further, the object curved surface deformation means 170 deforms the object curved surface on the basis of the calculated variations of the control points.

Hereinafter, a series of procedures for calculating variations of the control points is described with reference to formulas.

Generally, coordinates S(u, v) on the curved surface of an arbitrary space model (surface of the arbitrary space model) in three-dimensional space can be expressed by the following Equation [8].

$$S(u,v)=[x(u,v),y(u,v),z(u,v)] \quad [8]$$

Respective control points in the NURBS model have three-dimensional coordinates and are arranged in two directions, u and v, and the knot vectors thereof are defined with respect to the two directions u and v. In this case, if coordinates at each control point are indicated by $P_{i,j}$, and a basis function implemented using knot vectors is assumed to be $R_{i,j}(u,v)$, the curved surface of the NURBS model (surface of the NURBS model) is represented by the following Equation.

$$S(u, v) = \sum_{i=0}^{n} \sum_{j=0}^{m} R_{i,j}(u, v) P_{i,j} \quad [9]$$

If the weight of the basis function $R_{i,j}(u, v)$ in Equation [9] is set to 1, the function of the knot vectors is separated into the u and v directions, and can be represented by the following Equation.

$$R_{i,j}=N_{i,p}(u)N_{j,q}(v) \quad [10]$$

In this case, p denotes the degree in the u direction of the basis function of the NURBS model, and q denotes the degree in the v direction of the basis function of the NURBS model. Therefore, the curved surface (surface) having n and m control points in the u and v directions, respectively, is given by the following Equation [11].

$$S(u, v) = \sum_{i=0}^{n} \sum_{j=0}^{m} N_{i,p}(u)N_{j,q}(v)P_{i,j} \quad [11]$$

In a pseudo-inverse matrix using a variation value of a single point (sample vertex), which is the most basic form, the variation value $\Delta q_0$ of a single point placed on the curved surface can be represented by Equation [12], which is similar to Equation [11], $$\Delta q_0 = \sum_{i=0}^{n} \sum_{j=0}^{m} N_{i,p}(u_0)N_{j,q}(v_0)\Delta P_{i,j} \quad [12]$$

where $\Delta P_{i,j}$ is variation of the control point, and $N_{i,p}(u_0)$ and $N_{j,q}(v_0)$ are the basis functions at point $q_0$ in the directions u and v. When it is assumed that any one point on the curved surface is deformed, the variation $\Delta P_{i,j}$ must be calculated, as described above. The variation $\Delta P_{i,j}$ can be calculated using the product of $\Delta q_0$ and the pseudo-inverse matrix $N^+$ of a matrix N, and can be defined by the following Equation [13].

$$N_{i,p}^{+}(u_0)N_{j,q}^{+}(v_0)\Delta q_0 = \Delta P_{i,j} \quad [13]$$

For reference, a pseudo-inverse matrix $B^+$ at an arbitrary location $x_0$ in a linear equation represented by y=Bx is a matrix that satisfies $x_0=B^+y$. When B is an m×n matrix, the coefficient of each of the matrixes B, C, and D, satisfying B=CD, is k, C is an m×k matrix, and D is a k×n matrix. In this case, the pseudo-inverse matrix $B^+$ of B can be generalized using the following Equation.

$$B^{+}=C^{T}(CC^{T})^{-1}(D^{T}D)^{-1}D^{T} \quad [14]$$

Through the above description, it can be seen that the variation value $\Delta q_{k,l}$ of all points (sample vertexes) on the curved surface can be calculated using the following Equation [15]. For reference, $\Delta q_{k,l}$ can be calculated using the above Equation [7].

$$\Delta q_{k,l} = \sum_{i=0}^{n} \sum_{j=0}^{m} N_{i,p}(u_0)N_{i,q}(v_0)\Delta P_{i,j} \quad [15]$$

In this case, all points $q_{k,l}$ on the curved surface are arranged in the form of a square matrix having the same parameters in the directions u and v. Therefore, the variation $\Delta P_{i,j}$ of the control points can be calculated using the following Equation [16].

$$N_{i,p}^{+}(u_0)N_{j,q}^{+}(v_0)\Delta q_0 = \Delta P_{i,j} \quad [16]$$

The technical spirit of the present invention can be implemented as a program, and can be recorded and used in various computer-readable recording media.

Hereinafter, embodiments in which the technical spirit of the present invention is implemented are described.

Figure 6A:
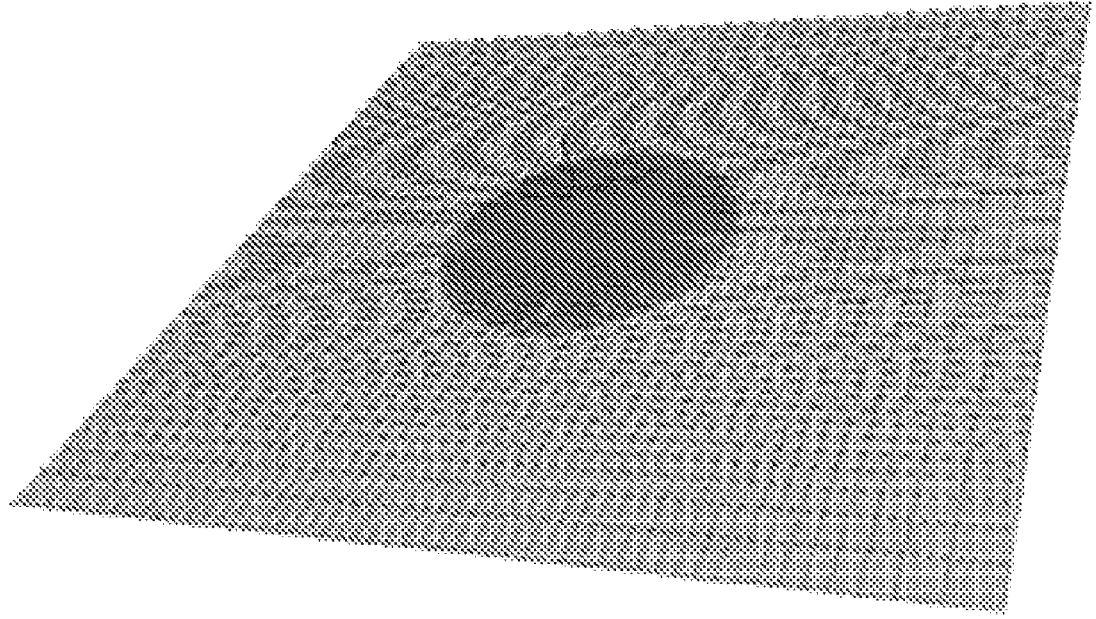
FIGS. 6A and 6B illustrate a procedure of deforming a curved surface using a single target point.
Figure 6B:
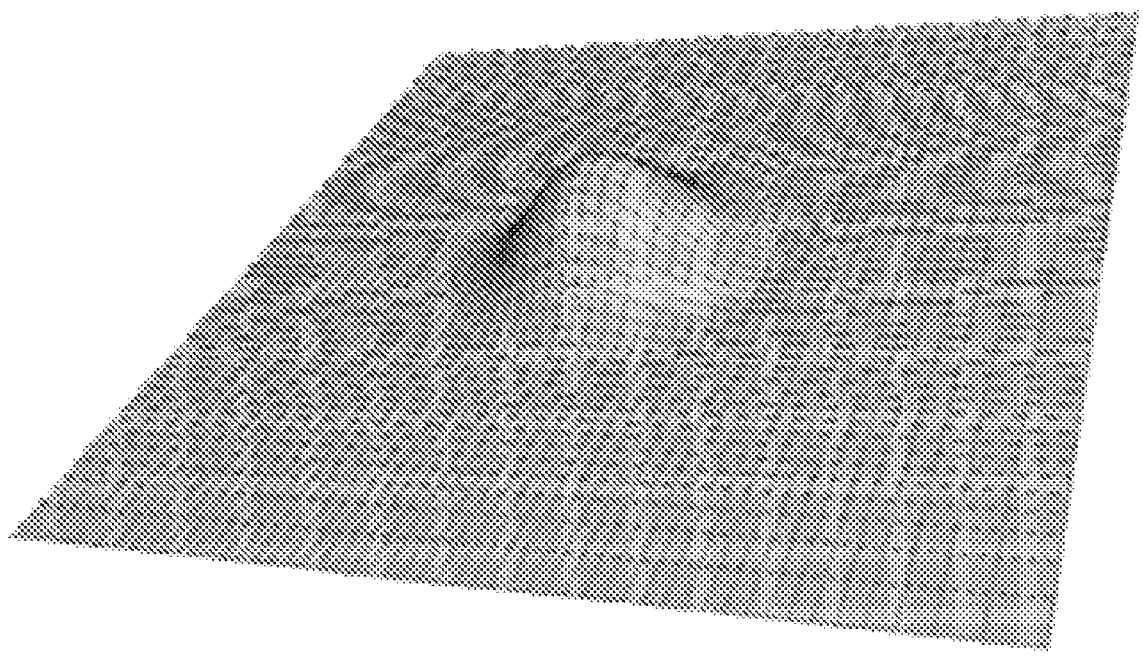

FIGS. 6A and 6B illustrate the deformation of a curved surface when a single target point is input. As shown in FIG. 6A, if interpolation is performed on the basis of sample vertexes within a deformation area, and thereafter the curved surface is deformed through a pseudo-inverse matrix on the basis of the deformed values of the interpolated sample vertexes, a deformed curved surface is obtained, as shown in FIG. 6B.

Figure 7A:
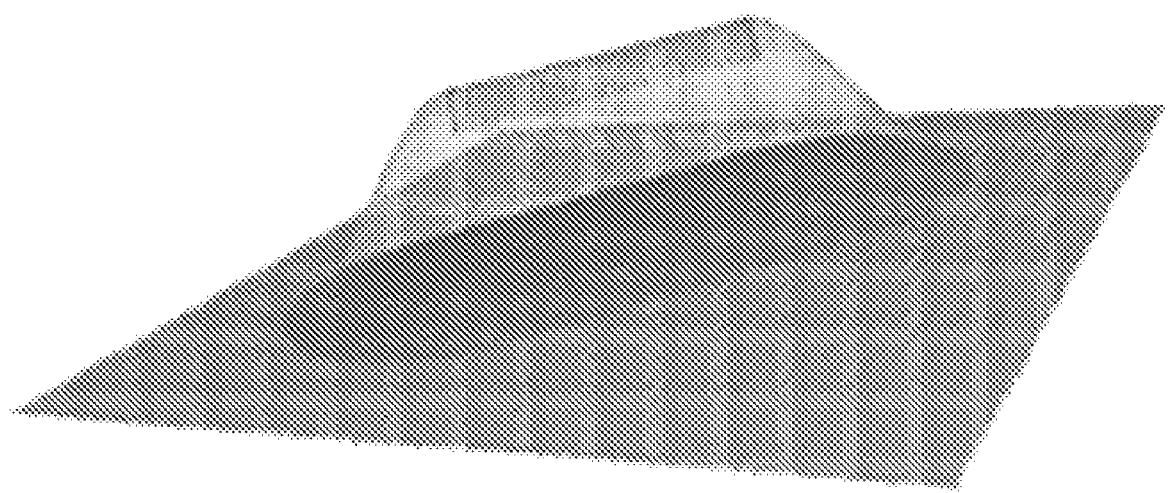
FIGS. 7A and 7B illustrate a procedure of deforming a curved surface using two target points.
Figure 7B:
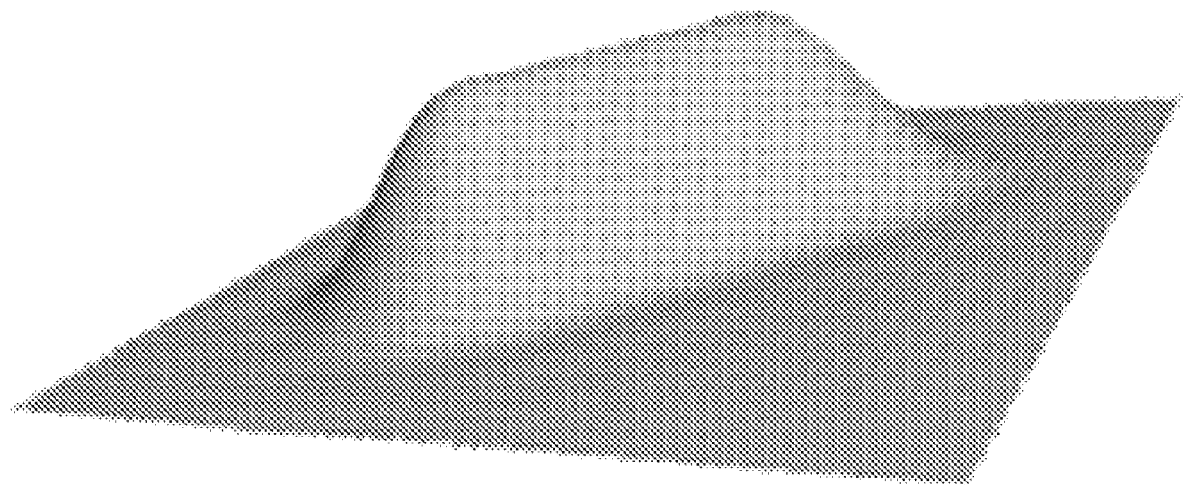

FIGS. 7A and 7B illustrate the deformation of a curved surface when two target points are input. If an arbitrarily set number of virtual target points is generated between two input target points and is interpolated using the two input target points, as shown in FIG. 7A, and thereafter the interpolated virtual target points are projected onto the curved surface to deform the curved surface, the deformed curved surface is obtained, as shown in FIG. 7B.

Figure 8A:
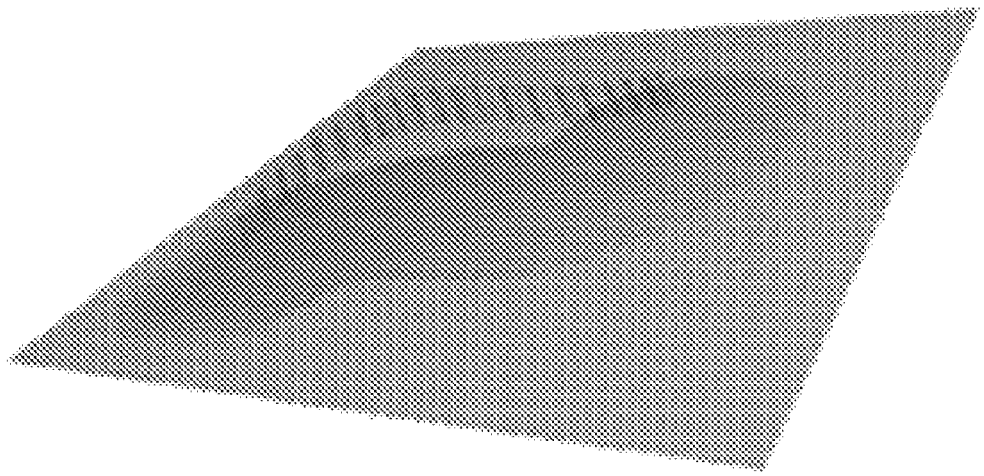
FIGS. 8A and 8B illustrate a procedure of deforming a curved surface using a target curve.
Figure 8B:
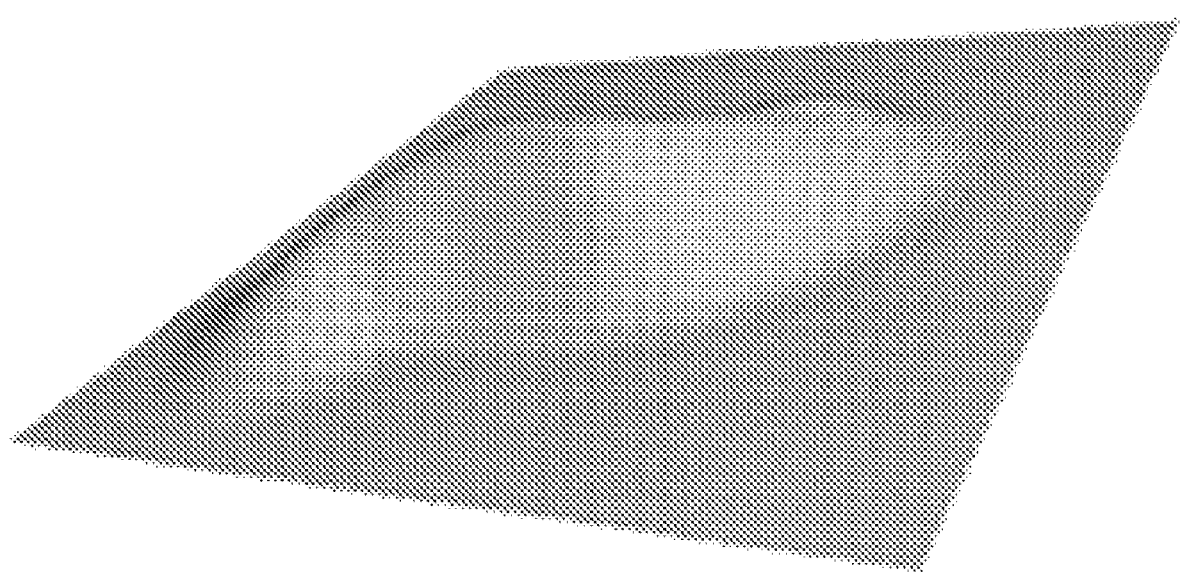

FIGS. 8A and 8B illustrate the deformation of a curved surface when a target curve is input. After respective target points on the input target curve are projected onto a curved surface, and are connected to close sample vertexes around the projected projection points, the sample vertexes are interpolated depending on variation from the connected projection points to the target points, as shown in FIG. 8A. Thereafter, the curved surface is deformed through a pseudo-inverse matrix, as shown in FIG. 8B.

Figure 9A:
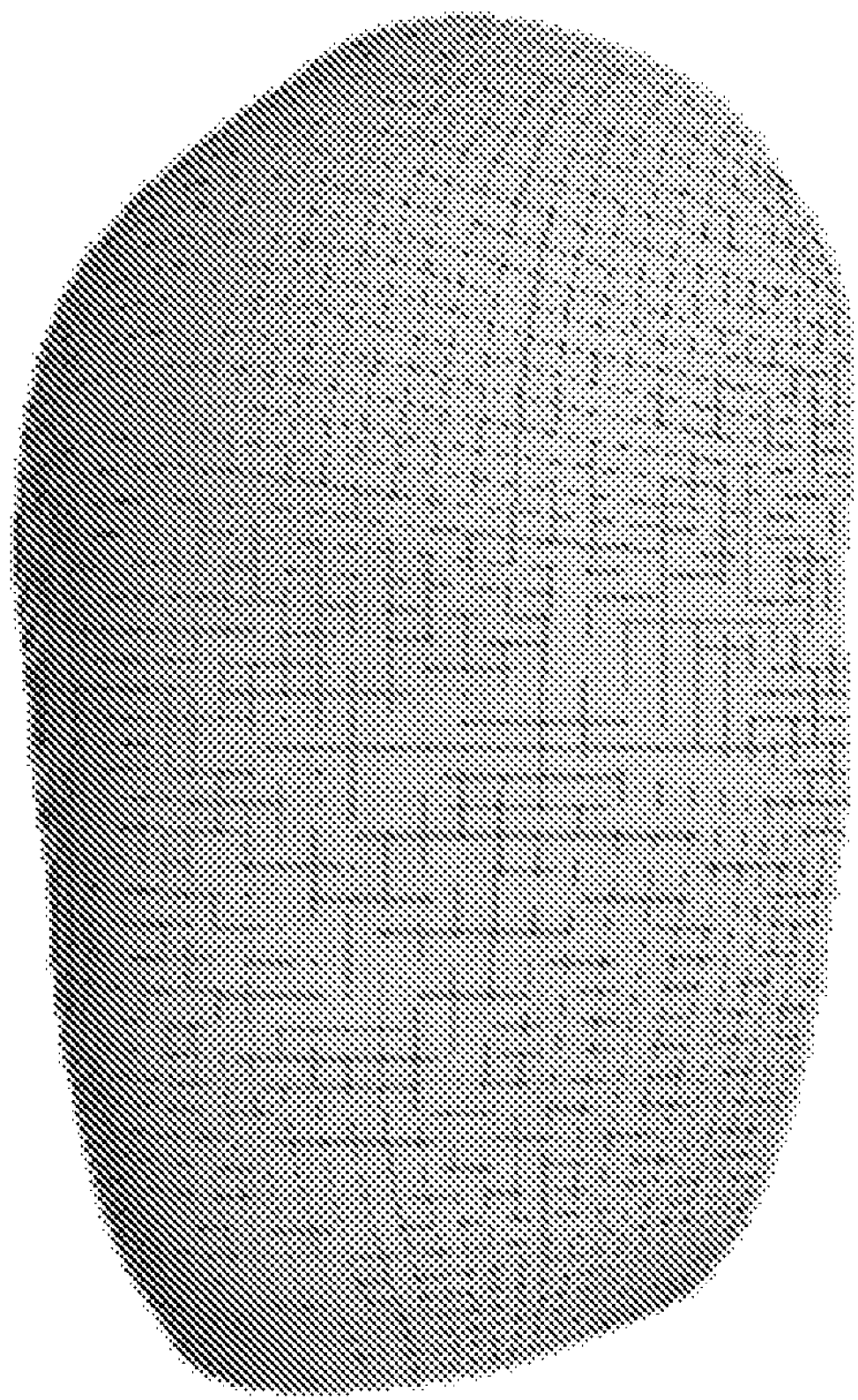
FIGS. 9A to 9I illustrate a procedure of deforming a curved surface using four target curves.
Figure 9B:
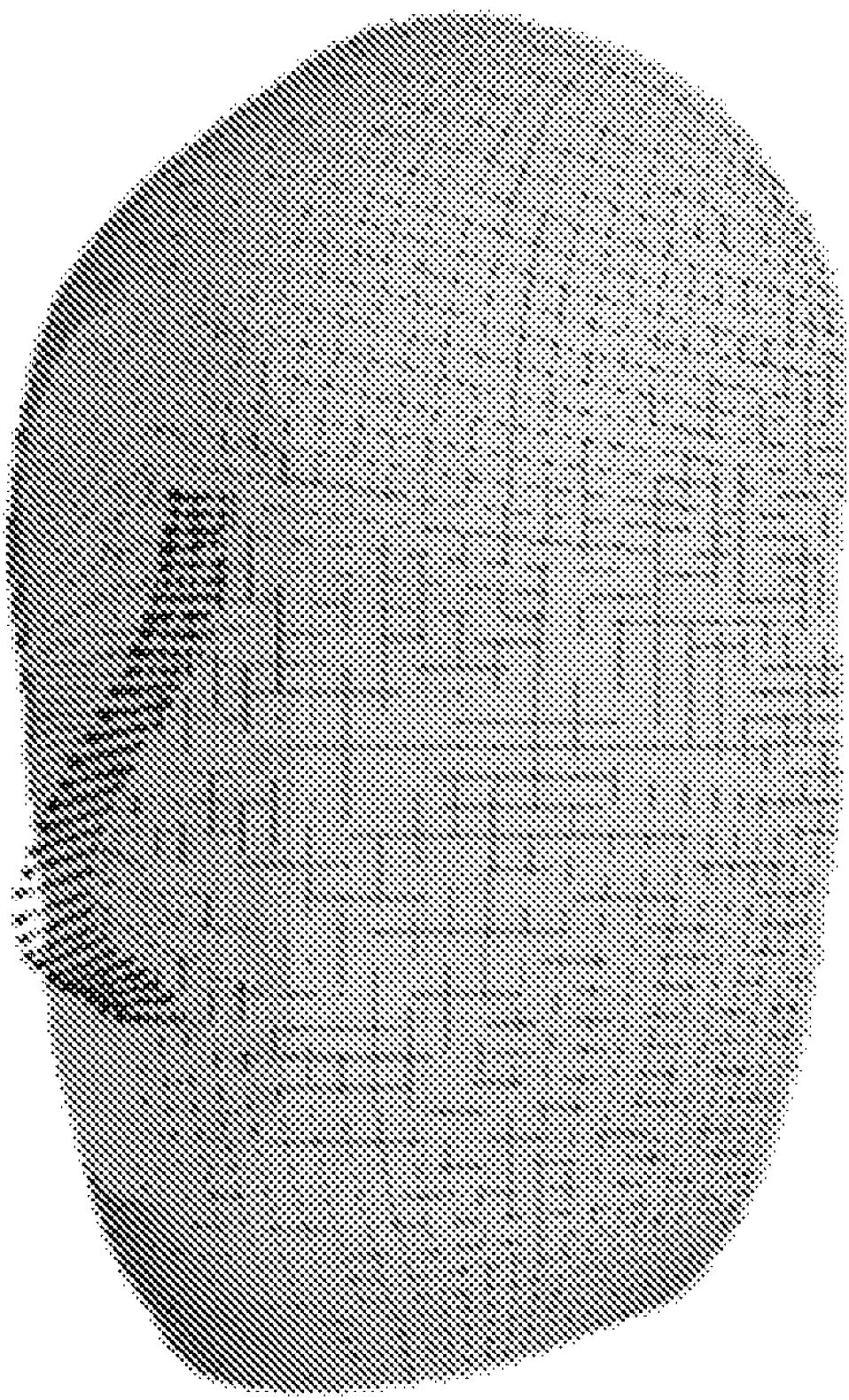
Figure 9C:
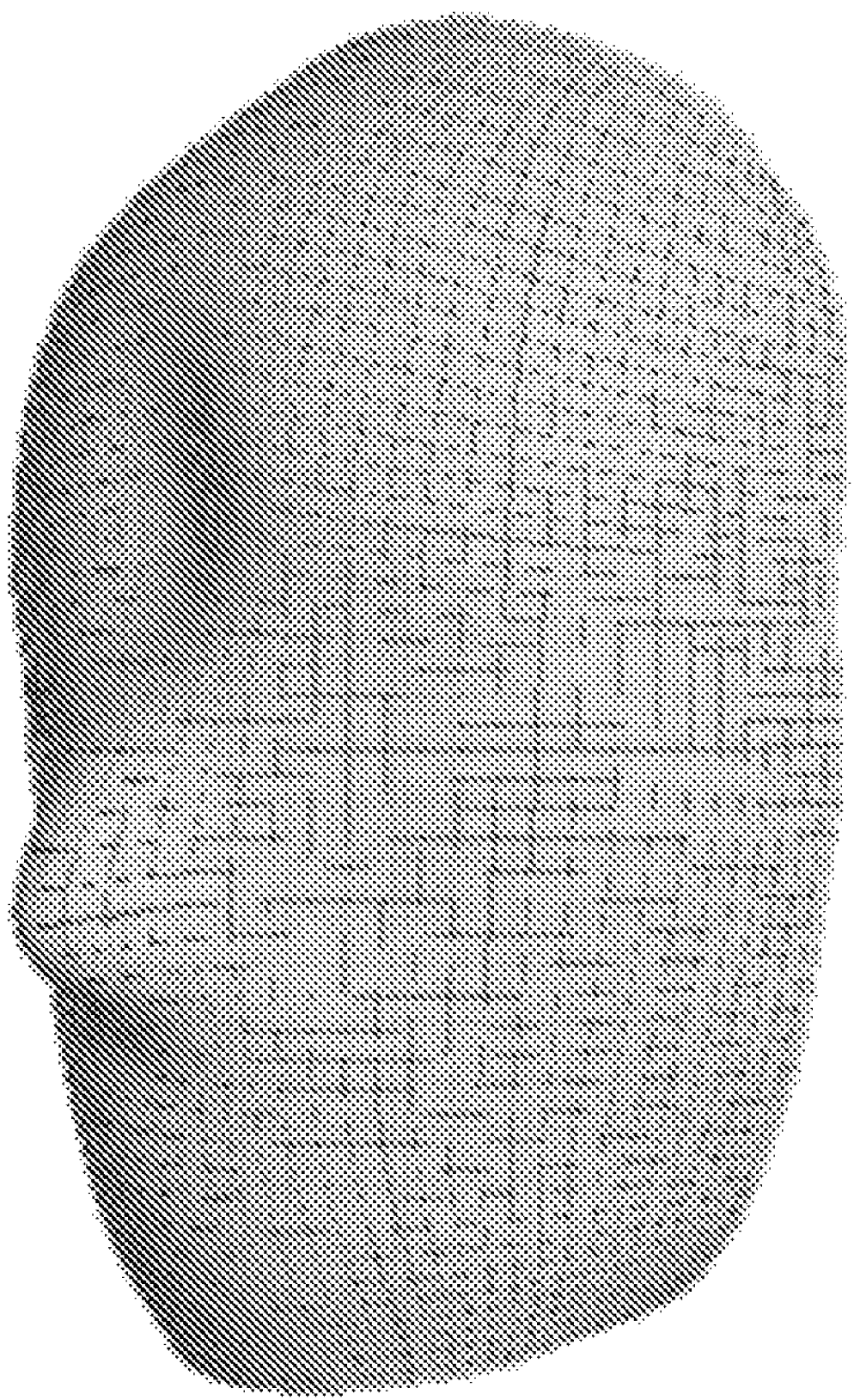
Figure 9D:
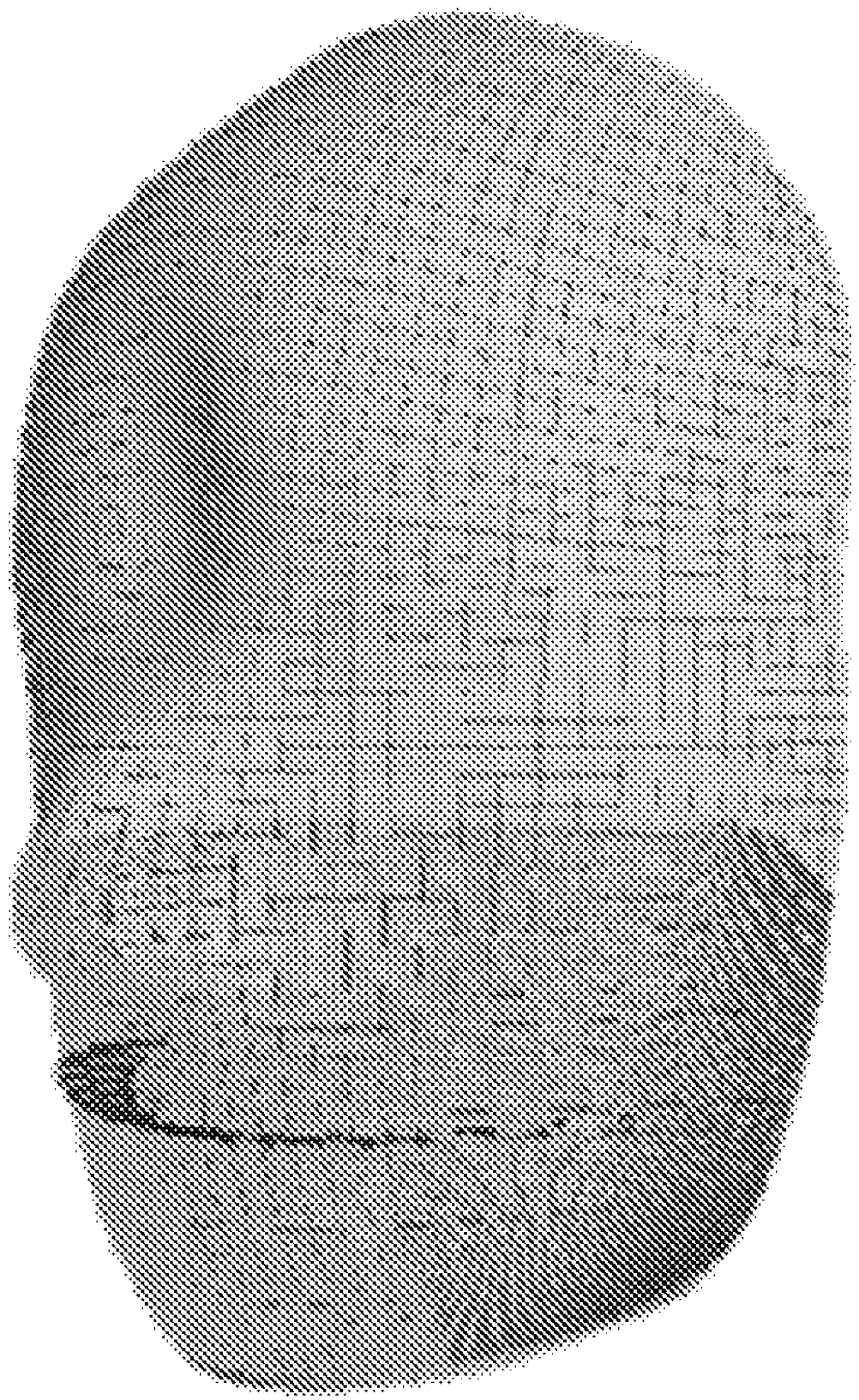
Figure 9E:
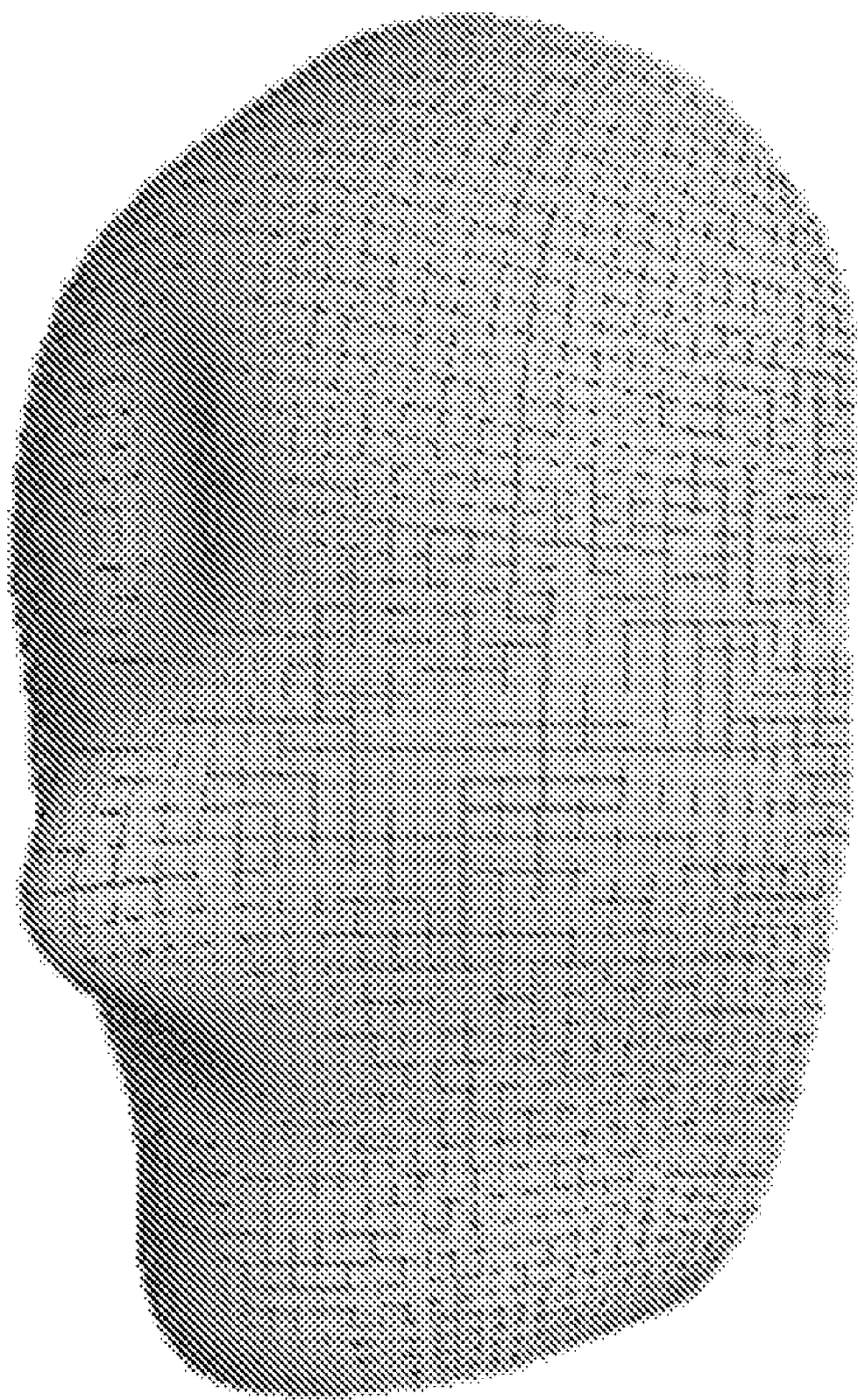
Figure 9F:
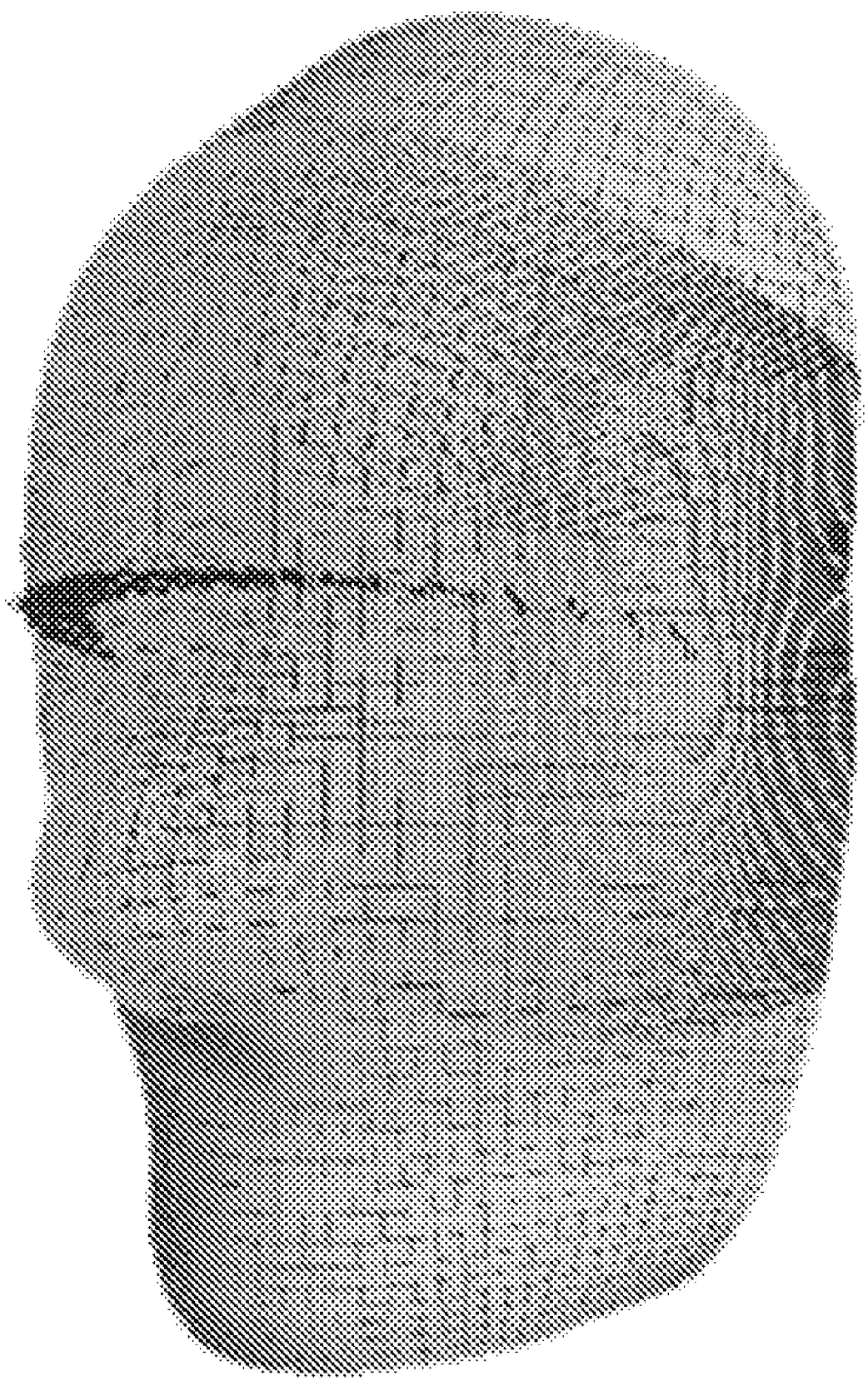
Figure 9G:
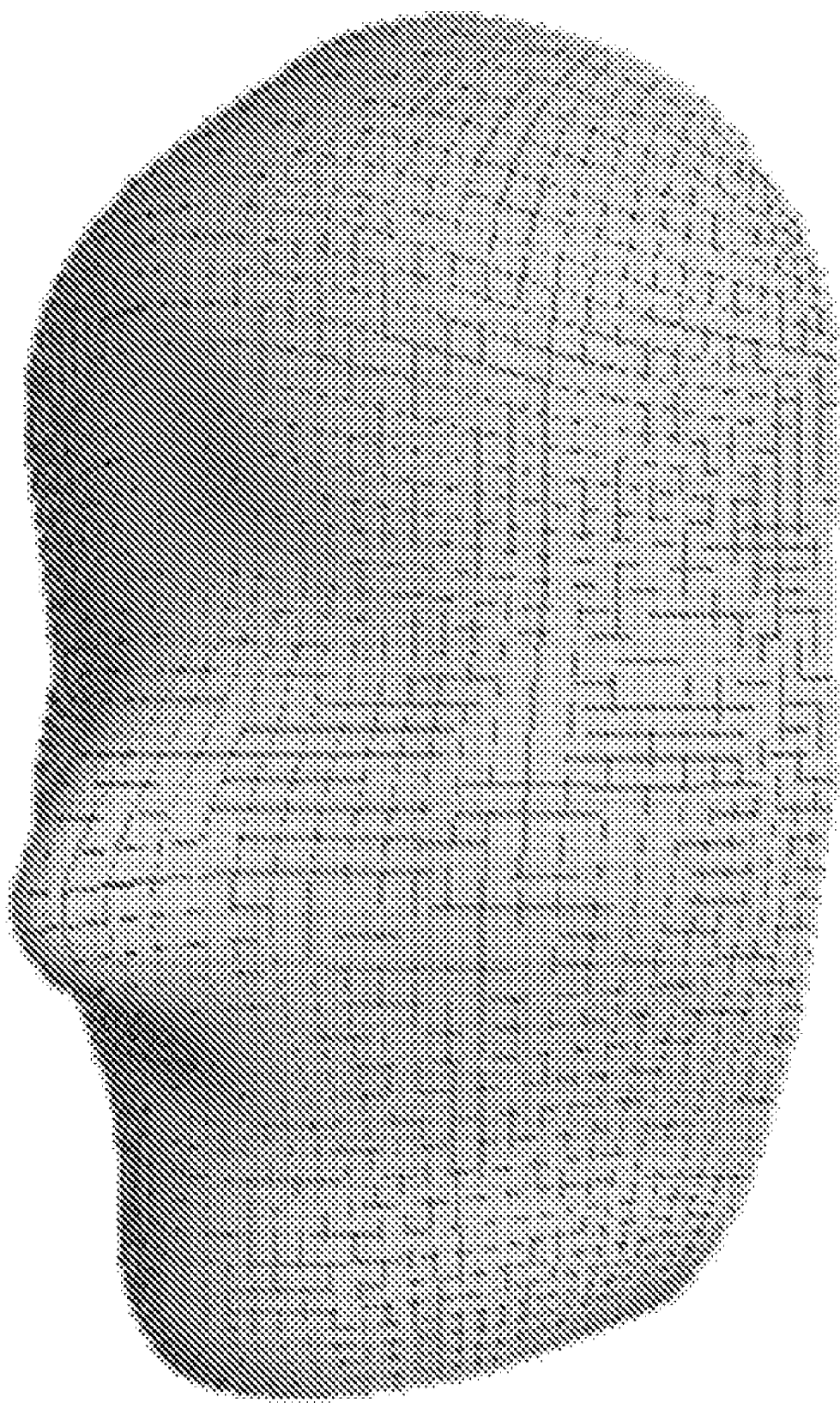
Figure 9H:
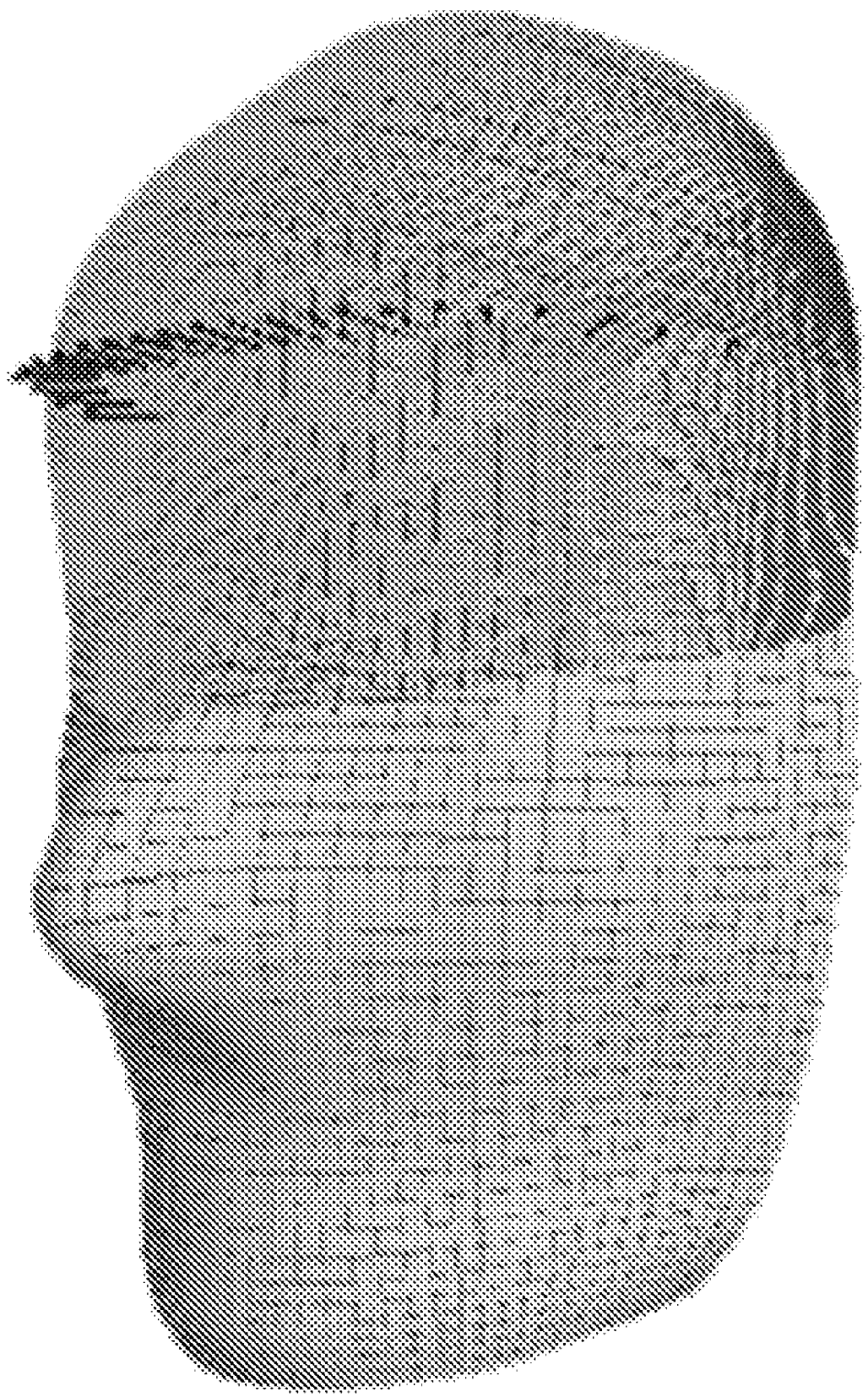
Figure 9I:
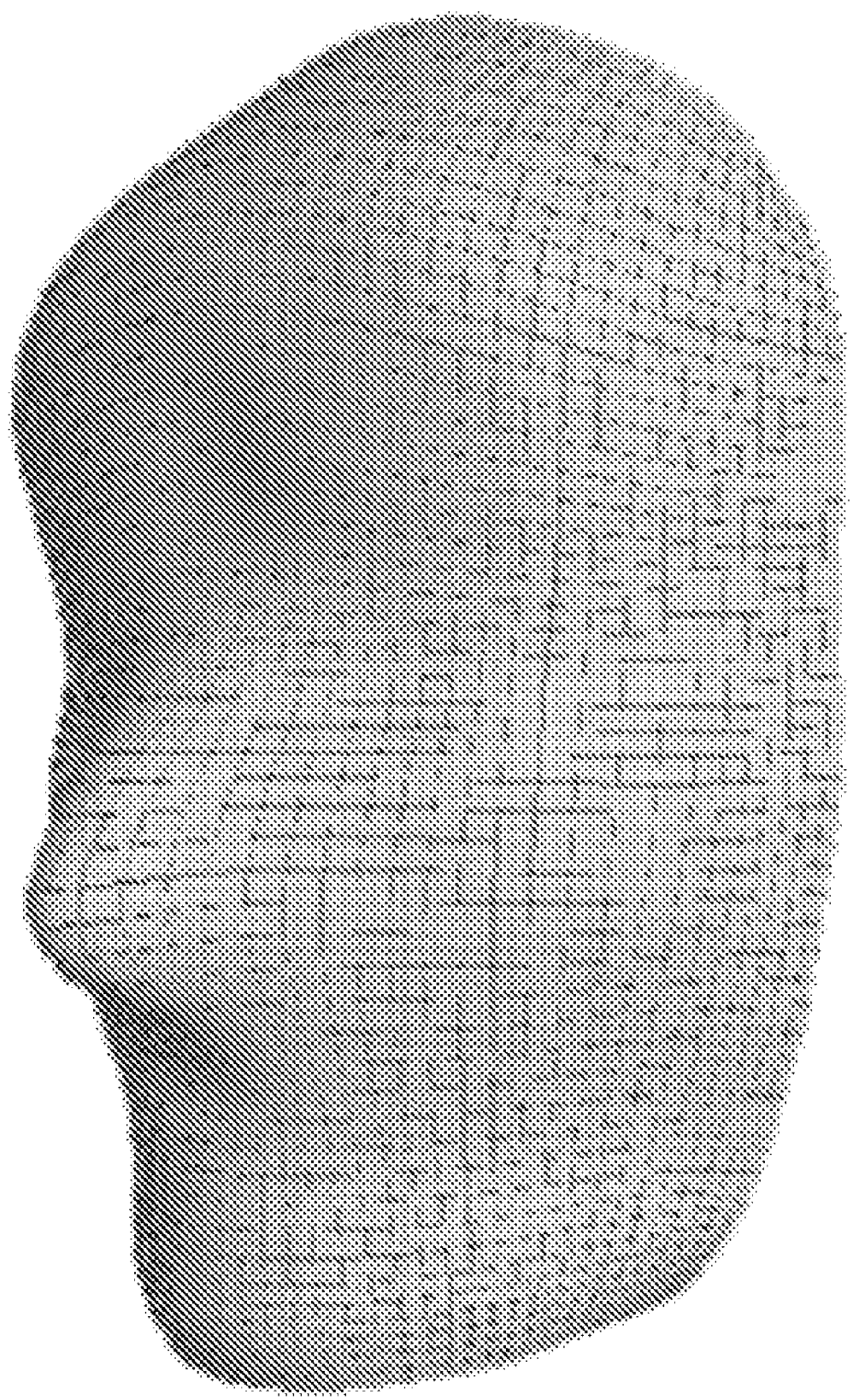

FIGS. 9A to 9I illustrate the deformation of a curved surface using four target curves. In the original NURBS model of FIG. 9A, results of the deformation of the curved surface by the target curve of FIG. 9B are shown in FIG. 9C. Results of the deformation of the curved surface by the target curve of FIG. 9D are shown in FIG. 9E, and results of the deformation of the curved surface by the target curve of FIG. 9F are shown in FIG. 9G. Further, results of the final deformation of the curved surface by the target curve of FIG. 9H are shown in FIG. 9I.

As described above, a series of operations of deforming a curved surface is implemented using a target curve that can be easily input, so that designers or users having drawing habits of mainly using curves can intuitively use the apparatus and method of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for deforming a curved surface using a three-dimensional target curve, the apparatus being based on a computer and adapted to deform a curved surface of a Non-Uniform Rational B-Spline (NURBS) model, comprising:

a computer usable medium having a computer readable program code embodied therein, said computer readable program code adapted to be executed for the following:

object curved surface selection means for selecting all or part of the curved surface of the NURBS model as an object curved surface;

sample vertex extraction means for extracting a plurality of vertexes from the object curved surface as sample vertexes;

basis function calculation means for calculating a basis function of the object curved surface;

target curve input means for inputting a target curve, composed of a plurality of target points having locations and directions, from a user;

target curve projection means for projecting the target curve onto the object curved surface;

control point variation calculation means for individually interpolating variation values x, y, and z ranging from projection points of the object curved surface corresponding to the target points, calculating variation values of sample vertexes included in a deformation area, and calculating variations of control points, constituting the object curved surface, using the calculated variation values and a pseudo-inverse matrix of the basis function; and object curved surface deformation means for deforming the object curved surface of the curved surface of the NURBS model on the basis of the calculated variations of the control points, and wherein the target curve projection means projects the target curve in such a way that, if a number of target points constituting the target curve is equal to or less than a predetermined value, virtual target points are generated through curve interpolation.

2. The apparatus according to claim 1, wherein the control point variation calculation means utilizes values ranging from a current location of each projection point to a corresponding target point as variation values, and interpolates the variation values through a polynomial interpolation method using variation values of adjacent projection points so as to cause other sample vertexes within the deformation area, connected to the projection point, to have continuous variation values.

3. A method of deforming a curved surface using a three-dimensional target curve, the method being based on a computer and adapted to deform a curved surface of a Non-Uniform Rational B-Spline (NURBS) model, comprising:

an abject curved surface selection step of selecting all or part of the curved surface of the NURBS model as an object curved surface;

a sample vertex extraction step of extracting a plurality of vertexes from the object curved surface as sample vertexes;

a basis function calculation step of calculating a basis function of the object curved surface;

a target curve input step of inputting a target curve, composed of a plurality of target points having locations and directions, from a user;

a target curve projection step of projecting the target curve onto the object curved surface in such a way that, if a number of target points, constituting the target curve, is equal to or less than a predetermined value, virtual target points are generated through curve interpolation;

a control point variation calculation step of individually interpolating variation values x, y, and z ranging from projection points of the object curved surface corresponding to the target points, calculating variation values of sample vertexes included in a deformation area, and calculating variations of control points, constituting the object curved surface, using a product of the calculated variation values and a pseudo-inverse matrix of the basis function; and an object curved surface deformation step of deforming the object curved surface of the curved surface of the NURBS model on the basis of the calculated variations of the control points.

* * * * *